Patented Oct. 2, 1951

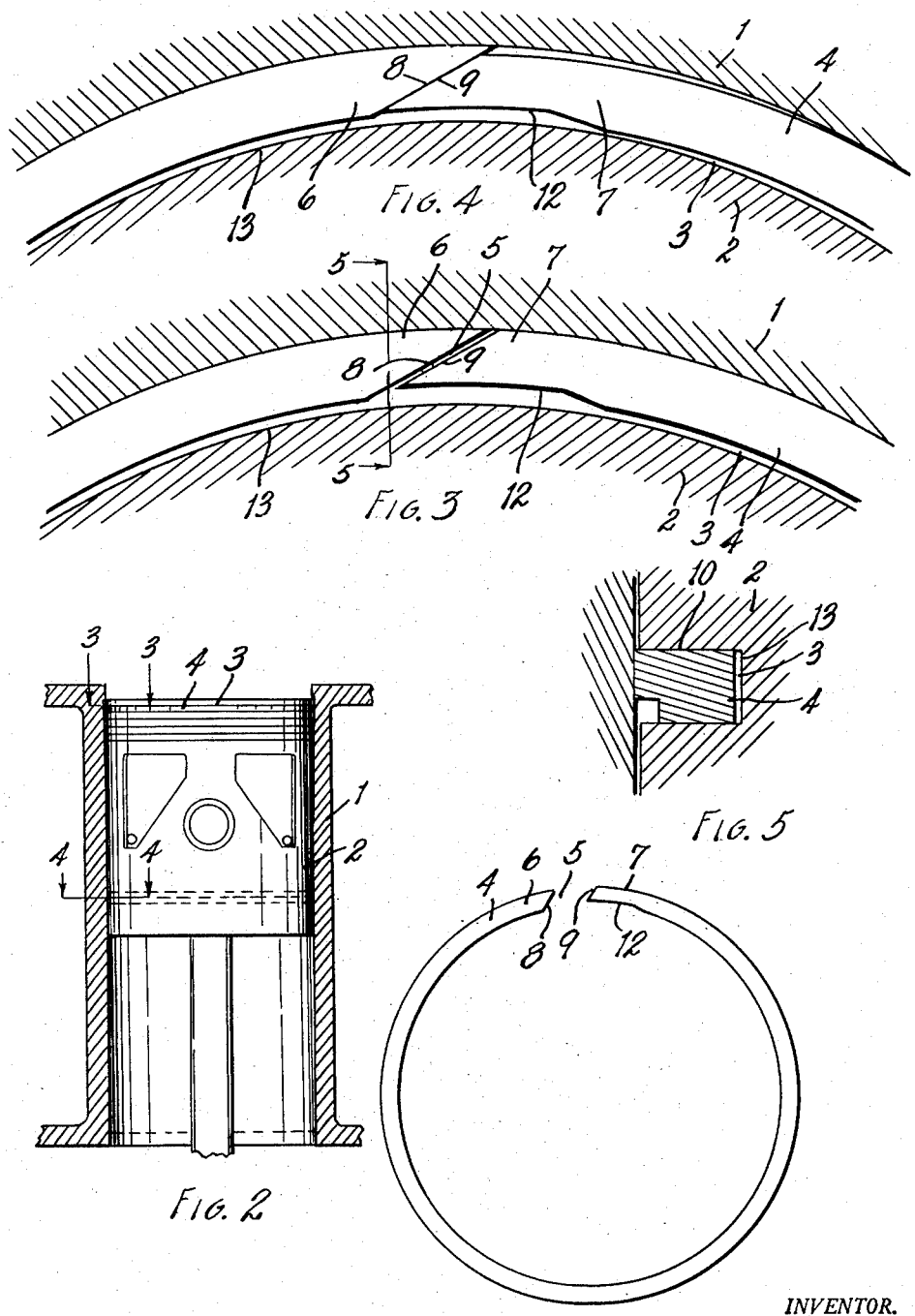

2,569,777

UNITED STATES PATENT OFFICE 2,569,777

PISTON RING

Harold P. Phillips, Hastings, Mich., assignor to Hastings Manufacturing Company, Hastings, Mich.

Application October 12, 1946, Serial No. 702,902

4 Claims. (Cl. 309—46)

This invention relates to improvements in piston rings.

The main objects of the invention are:

First, to provide a piston ring of the split ring type having a joint so formed as to permit the joint to be fitted tighter or the opposed split ends on opposite sides of the gap opening to be normally disposed in closer relation to each other and be safe from scuffing or seizing a cylinder wall in the event of possible error or possible higher temperatures, which would expand the ring more than anticipated.

Second, to provide a piston ring of the type above described having the joint or gap angularly so disposed that when the diameter of the ring increases beyond a predetermined amount due to change in temperature, the opposed ends of the ring on the opposite sides of the gap or joint slidingly engage each other without affecting the axial dimensions of the ring.

Third, to provide a ring of the type above described having a gap or joint so disposed that if the ring is put in a cylinder somewhat smaller than intended, or if the reduction in the diameter of the cylinder is intentional, that the joint slides by, in other words slips over itself, to prevent the solid square butting of the joint, which would cause the ring to scuff and seize a cylinder wall.

Fourth, to provide a piston ring of the above type that facilitates a quick wear-in or rapid seating of the ring to the cylinder within which it is installed.

Other objects relating to details and economies of the invention will appear from the description to follow. The invention is defined and pointed out in the claims.

A preferred embodiment of the invention is illustrated in the accompanying drawings, in which:

Fig. 1 is a plan view of a piston ring embodying the features of my invention.

Fig. 2 is a view illustrating the ring in assembled relation to a piston and cylinder of an internal combustion engine, the piston being shown in side elevation and the cylinder in vertical section.

Fig. 3 is an enlarged fragmentary view showing the position of the piston ring in relation to the piston and cylinder at the time the ring is at the top of its travel or in the position of the line 3—3 of Fig. 12, the ring being in plan and the piston and cylinder being in horizontal section.

Fig. 4 is an enlarged fragmentary view showing the position of the piston ring relative to the piston and cylinder at the time the ring is at the bottom of its travel, or in the position of line 4—4 of Fig. 2, the ring being in plan, and the piston and cylinder being in horizontal section.

Fig. 5 is an enlarged fragmentary view of the ring, piston and cylinder in vertical section on the line 5—5 of Fig. 3.

In considering the accompanying drawing it should be borne in mind that no attempt has been made to show the parts in their exact relative proportion and when associated with the piston and cylinder to show the exact clearances and relative dimensions.

Referring to the drawing, the numeral 1 indicates in general a cylinder having a piston 2 reciprocable therein, the latter being provided with an annular groove 3 adapted to receive the split ring 4 provided with the diagonal joint or gap 5. This joint is formed by correspondingly shaping or beveling the opposed ends 6 and 7 of the ring, the planes of the beveled surfaces 8 and 9 of said ends being disposed substantially parallel to each other and at a substantial angle to a radial line of the ring intersecting the split or joint 5 so as to permit a combined radially inward and circumferential sliding engagement of the end portion 7 relative to the end portion 6. The angle of the surfaces 8 and 9 to the radial line intersecting the same may desirably be approximately 60°. The angle should permit quite free slipping movement of the surfaces on each other. The surfaces 8 and 9 or the planes thereof are disposed at right angles to the upper and lower parallel sides 10 and 11 of the ring or at right angles to the plane of the ring so as to permit sliding engagement of the surface 9 relative to the surface 8 without affecting the axial width of the ring 4 in the groove 3. The inner periphery of the end portion 7 of the ring adjacent the split or gap thereof is cut away at 12 to permit the inward sliding movement of said end portion in the event that there is not sufficient clearance between the ring and the bottom 13 of the groove 2 to permit of such inward movement.

The joint 5, angularly disposed as above described, permits of a relatively close fit at the gap opening, it being possible to fit rings with an opening of .002 inch per each inch diameter of the ring, down to a gap opening of zero, the gap opening being normally preferably approximately .0015 inch per each inch diameter of the ring, as compared to the usual gap opening of .003 inch per inch diameter of ring now in common practice with other rings.

In the event of a possible higher temperature which would expand the ring more than anticipated, or greater than the gap opening between the beveled ends 6 and 7, then the beveled end 7 is forced by such expansion radially inwardly, slidingly engaging the beveled end 6 during such inward movement as shown in Fig. 4, thereby preventing the solid square butting of the joint which would cause the ring to scuff and seize the cylinder wall. Also the joint diagonally disposed as above described constitutes a further safety factor against the ring, scuffing or seizing the cylinder wall in the event the ring is put in a cylinder somewhat smaller than intended.

A ring provided with this joint may be so fitted to a cylinder as to cause the ring to seat rapidly. For instance, the ring may be fitted to the cylinder with a gap of such dimension that when at the bottom of its travel in the cylinder slightly tapered inwardly towards its bottom, that the gap is tightly closed or the beveled end 6 abuts the beveled end 7. Expansion caused by heat of the engine causes the ring to increase in length or circumference. The extra load thrown on the ring by this expansion causes the ring to seat rapidly without scoring or seizing the cylinder wall, as shown in Fig. 4. The final windup is a seated ring with no gap at the tightest part of the ring travel, the closest gap possible at any part of the ring travel.

In Fig. 2 the line 3—3 indicates the position of the ring 4 at the top of its travel in the cylinder 1 slightly tapered inwardly towards its bottom, the gap opening in the ring in this position of its travel being indicated in Fig. 3. The line 4—4 of Fig. 2 indicates the position of the ring relative to the cylinder at the bottom of the ring travel, the position of the beveled ends 6 and 7 in this position of the ring being indicated in Fig. 4. During the initial wear-in of the ring, the end portion 7 is deflected slightly radially inwardly as shown in Fig. 4 due to expansion of the ring caused by heat of the engine.

I have illustrated and described a very practical embodiment of my invention. I have not attempted to illustrate or describe other embodiments or adaptations as it is believed this disclosure will enable those skilled in the art to embody or adapt my invention as may be desired.

Having thus described my invention, what I claim as new and desire to secure by Letters Patent is:

1. A split expansible piston ring having opposed parallel surfaces on the opposed sides of the split thereof disposed at a substantial angle to a radial line intersecting said split to permit a combined radially inward and circumferential sliding engagement of one end portion relative to the other end portion, said opposed surfaces being disposed substantially at right angles to the plane of the ring to permit said sliding engagement without affecting the axial dimensions of the ring, one of said opposed parallel surfaces being disposed generally radially inwardly of the other opposed parallel surface, the end portion of the ring having the inner of said opposed parallel surfaces having its inner periphery cut away adjacent the split to a radial dimension less than that of the other end portion to facilitate radially inward movement of the radially inward surface during said sliding engagement, said ring element from the radially reduced end portion being of substantially uniform radial thickness to the outer of said opposed surfaces at the opposite end of the ring element, said inner surface of said opposed parallel surfaces being disposed inwardly of the opposed outer parallel surface throughout the substantial entirety of said inner surface to permit the end of the ring which is cut away to flex inwardly without engaging the other end of the ring.

2. A split expansible piston ring having opposed parallel surfaces on the opposed sides of the split thereof disposed at a substantial angle to a radial line intersecting said split to permit a combined radially inward and circumferential sliding engagement of one end portion relative to the other end portion, said opposed surfaces being disposed substantially at right angles to the plane of the ring to permit said sliding engagement without affecting the axial dimensions of the ring, one of said opposed parallel surfaces being disposed generally radially inwardly of the other opposed parallel surface, the radial dimension of the end portion having the inner surface of said opposed parallel surfaces being less than that of the end portion having the outer surface of said opposed parallel surfaces, said ring element from the radially reduced end portion being of substantially uniform radial thickness to the outer of said opposed surfaces at the opposite end of the ring element, said inner surface of said opposed surfaces being disposed inwardly of the outer opposed surface throughout the substantial entirety of said inner surface to permit the end portion of the ring of the smaller radial dimension to flex inwardly without engaging the end portion of the ring of the larger radial dimension.

3. A split expansible piston ring having the opposed surfaces on the opposed sides of the split thereof disposed at a substantial angle to a radial line intersecting said split to permit a combined radially inward and circumferential sliding engagement of one end portion relative to the other end portion, said opposed surfaces being disposed substantially at right angles to the plane of the ring to permit said sliding engagement without affecting the axial dimensions of the ring, the radial dimensions of the end portion of the ring having the inner of the opposed angular surfaces being less than that of the end portion having the outer of the opposed angular surfaces, said ring element from the radially reduced end portion being of substantially uniform radial thickness to the outer of said opposed surfaces at the opposite end of the ring element, said inner surface of said opposed surfaces being disposed inwardly of the outer opposed surface throughout the substantial entirety of said inner surface to permit the end portion of the ring of the smaller radial dimension to flex inwardly without engaging the end portion of the ring of the larger radial dimension.

4. A split expansible piston ring having normally an open gap at the split thereof and having the surfaces on the opposite sides of the split thereof disposed at a substantial angle to a radial line intersecting the split to permit a combined radially inward and circumferential sliding engagement of one end portion relative to the other end portion, said opposed surfaces being disposed substantially at right angles to the plane of the ring to permit said sliding engagement without affecting the axial dimensions of the ring, the end portion of the ring having the inner surface of the opposed angular surfaces having its inner periphery cut away adjacent the split to permit radially inward movement thereof during said sliding engagement, said inner surface of said opposed surfaces throughout the substantial entirety of said inner surface being disposed inwardly of the opposed outer surface to permit the end of the ring which is cut away to flex inwardly without engaging the other end of the ring, said ring being of such dimensions that at the time of installation in a cylinder inwardly tapered toward the bottom thereof, that the ring is compressibly closed with the ends at the split in abutting engagement at the bottom of the ring travel in the cylinder, and expansibly opened at the top of the ring travel, said ring element from the radially reduced end portion being of substantially uniform radial thickness to the outer of said opposed surfaces at the opposite end of the ring element.

HAROLD P. PHILLIPS.

REFERENCES CITED

The following references are of record in the file of this patent:

UNITED STATES PATENTS

| Number | Name | Date |
|---|---|---|
| 1,094,057 | Chevrolet | Apr. 21, 1914 |
| 1,369,075 | Ballman | Feb. 22, 1921 |
| 1,369,104 | Hendrickson | Feb. 22, 1921 |
| 1,436,774 | Mummert | Nov. 28, 1922 |
| 2,065,817 | Marien | Dec. 29, 1936 |

FOREIGN PATENTS

| Number | Country | Date |
|---|---|---|
| 612,936 | Germany | May 8, 1935 |